United States Patent [19]

Tastu et al.

[11] Patent Number: 4,769,073

[45] Date of Patent: Sep. 6, 1988

[54] CERIC OXIDE/CEROUS SALT ORGANIC GLASS POLISHING COMPOSITIONS

[75] Inventors: Francis Tastu, Nieul/sur/Mer; Pierre Mélard, Courbevoie, both of France

[73] Assignee: Rhone-Poulenc Chimie, Courbevoie, France

[21] Appl. No.: 101,409

[22] Filed: Sep. 28, 1987

[30] Foreign Application Priority Data

Sep. 26, 1986 [FR] France .................................. 86 13443

[51] Int. Cl.$^4$ ................................................ C09G 1/02
[52] U.S. Cl. .......................................... 106/3; 51/308; 51/309
[58] Field of Search ...................... 51/308, 309; 106/3

[56] References Cited

U.S. PATENT DOCUMENTS

| | | | |
|---|---|---|---|
| 3,262,766 | 7/1966 | Nonamaker | 51/309 |
| 3,768,989 | 10/1973 | Goetzinger et al. | 51/309 |
| 4,389,819 | 6/1983 | Williamson et al. | 51/309 |
| 4,529,410 | 7/1985 | Khaladji et al. | 51/309 |
| 4,601,755 | 7/1986 | Mélard et al. | 106/3 |

*Primary Examiner*—Paul Lieberman
*Assistant Examiner*—Willie J. Thompson
*Attorney, Agent, or Firm*—Burns, Doane, Swecker & Mathis

[57] ABSTRACT

Cerium-based polishing compositions, well adapted for the rapid and efficient polishing of organic glass surfaces, e.g., plastic ophthalmic lenses and plastic sheet material, are comprised of intimate admixture of particulate ceric oxide and a water soluble cerous salt.

31 Claims, No Drawings

CERIC OXIDE/CEROUS SALT ORGANIC GLASS POLISHING COMPOSITIONS

BACKGROUND OF THE INVENTION

1. Field of the Invention:

The present invention relates to cerium-based polishing compositions especially adapted for the polishing of organic glasses, and, more particularly, for the polishing of plastic ophthalmic lenses and plastic sheet material.

By the term "organic glasses" are intended all organic shaped articles requiring polishing for any given end application. These include, for example, synthetic polymers, most typically polycarbonates, in particular polydiallylglycol carbonates in the form of ophthalmic lenses or in the form of sheet material, e.g., automotive windows and windshields.

2. Description of the Prior Art:

At the present time, the organic glasses command an ever-increasing share of the glass market. This increase may be attributed to the fact that the organic glasses possess certain characteristics which the mineral (inorganic) glasses do not have. Their impact resistance makes them a material of primary choice when questions of safety are involved: protective glasses, corrective lenses for children, and the like.

Furthermore, they are much lighter and are well suited for glasses requiring delicate mounting or have large diameters.

The polishing of organic glasses is quite delicate and difficulties therein focus on the fact that they are soft, fragile and very sensitive to scratching. Inadequate polishing results in fine scratches and polishing that is too abrasive may result in course scratches, streaks, or even a haze.

While the polishing composition must make it possible to impart a good surface condition onto the organic glass substrate, it must be borne in mind that economic requirements mandate a polishing efficiency sufficient to keep pace with the rate of industrial production.

Polishing compositions usually consist of an abrasive powder in suspension in an organic or aqueous medium, optionally containing other additives.

Exemplary of such abrasive materials, alumina, tin oxide, or mixtures thereof, are currently widely used. If these oxides are contained in the polishing composition, the polishing efficiency is good, but the quality of the polished finish of the organic glass is mediocre in light of deteriorating transparency caused by the presence of a haze and poor surface conditions due to scratching.

It has been suggested in this art to improve these results by using an oxide of a rare earth, in particular ceric oxide. The polishing of organic glasses using an aqueous suspension of ceric oxide has not to date been satisfactory, as numerous fine scratches remain on the surface of the organic glass due to insufficient polishing.

To obviate the aforementioned disadvantages, in German Pat. No. 2,508,871 a polishing compound having the following composition by weight has been proposed: 30% to 45% cerium oxide having a grain size less than 36 $\mu$m, 5% to 15% glycerin and 45% to 60% water.

However, the polishing times required in the use of such composition are longer than those required for polishing with the conventional oxides.

Furthermore, the final polish is not entirely satisfactory, if it is desired to perform certain surface treatments, such as anti-reflection or anti-abrasion treatments, on ophthalmic lenses, which require an excellent quality of the support, as they accentuate the presence of any defect.

To improve the quality of the polish and to reduce the polishing time by 10% relative to that required when using ceric oxide alone, French Pat. No. 2,414,071 describes a polishing material containing ceric oxide in suspension in water and combined with a thickener, such as carboxyethylcellulose, ethylcellulose, methylcellulose, polyvinyl alcohol, sodium polyacrylate, polymethylene oxide, carboxypolymethylene, polyvinylpyrrolidone, casein, gum arabic, and a surface tension reducing agent such as an alkaline alkylaryl sulfonate, lauryl sulfonate, dodecyl sulfonate, dodecyl sulfate, lauryl ether sulfate, dioctyl sulfosuccinate, dihexyl sulfosuccinate, diamyl sulfosuccinate, phosphoric acid polyesters and polysiloxanes.

The surface finish obtained by using the aforementioned composition is satisfactory. However, it remains necessary to further improve the polishing time, as an increase of 10% is still inadequate in view of the present rates of industrial production of ophthalmic lenses.

SUMMARY OF THE INVENTION

Accordingly, a major object of the present invention is the provision of an improved polishing agent for the organic glasses, one that not only imparts a high quality surface finish, but which is also highly efficient and permits polishing times comparable to those associated with the conventional oxides of the prior art.

Briefly, the present invention features an improved polishing composition comprising ceric oxide and a water-soluble cerous salt which remains soluble under the conditions of polishing.

DETAILED DESCRIPTION OF THE PREFERRED EMBODIMENTS OF THE INVENTION

More particularly according to the present invention, in the subject compositions the ceric oxide may be used either alone, or in the form of a compound based on ceric oxide.

Thus, as utilized herein, the term "ceric oxide" comprehends both ceric oxide alone or a compound thereof.

The ceric oxide adapted for use according to this invention may be any ceric oxide having the following physico/chemical properties:

It is in powder form having particle dimensions less than approximately 20 $\mu$m. Preferably, a ceric oxide having dimensions ranging from 0.1 $\mu$m to 10 $\mu$m is used; the grain size analysis being carried out using a Sedigraphic 5000 D instrument, which measures the rate of sedimentation of the particles in suspension and automatically displays the results in a cumulative percentage distribution as a function of equivalent spherical diameters (based on Stoke's law).

Respecting the specific surface of the ceric oxide, it advantageously ranges from 1 to 35 $m^2/g$ and, preferably, an oxide is selected which has a specific surface ranging from 3 to 10 $m^2/g$ (measured by the method of BRUNAUER-EMMETT-TELLER described in the *Journal of the American Chemical Society*, 60, p. 309 (1938)).

The purity of the ceric oxide is not critical. It is thus possible to use a very pure ceric oxide, in particular that commercially available under the trademark Opaline and marketed by Rhone-Poulenc Co. It has a purity greater than 99%.

It is also possible to use a ceric oxide combined with one or more oxides of the rare earths and/or one or more salts.

Preferably, a polishing agent containing at least approximately 30% by weight of ceric oxide is used.

The ceric oxide may be used in the form of the compounds described in French Pat. No. 2,472,601.

The compounds described in said French Pat. No. 2,472,601 are prepared by a process which includes simultaneously and continuously mixing a solution of the cerium salt, a basic solution and a solution of at least one acid and/or a salt (the anion or anions of which are capable of forming insoluble rare earth compounds), the number of basic equivalents employed being equal to or greater than the number of cerium equivalents and the pH of the reaction medium being higher than 6; and then filtering the resulting precipitate and drying and calcining same.

In the first stage, the reagents are intimately admixed.

The solution of the cerium salt may be any aqueous solution of the cerium salt, in either the cerous and/or ceric state and soluble under the conditions of the invention, and, in particular, a solution of cerous chloride or cerium nitrate in the cerous or ceric state, or a mixture of both.

The concentration of the solution of the cerium salt is not critical and it may vary over wide limits. A concentration of from 0.5 to 2 moles per liter is preferred.

The cerium is preferably introduced into the reaction medium in the cerous state and is then oxidized to the ceric state by continuously adding to the reaction mixture, in a solution other than that containing the base, an oxidizing agent compatible with said medium. Exemplary of the oxidizing agents suitable for use herein, the following are particularly representative: solutions of sodium, potassium or ammonium perchlorate, hypochlorite or persulfate, hydrogen peroxide, or air, oxygen or ozone. It is also possible to oxidize the cerium electrochemically. Preferably, hydrogen peroxide is used.

The proportion of the oxidant relative to the cerous salt to be oxidized may vary over wide limits. It is typically greater than the stoichiometric amount and preferably is a stoichiometric excess of from 10% to 40%.

The basic solution is advantageously an aqueous solution of ammonia, sodium hydroxide or potassium hydroxide and an ammonia solution is preferably used.

The normality of the basic solution is not a critical factor and also may vary over wide limits. Advantageously, it ranges from 1 to 5N.

The proportion between the basic solution and the solution of the cerium salt must be such that the number of basic equivalents introduced is greater than or equal to the number of cerium equivalents introduced at the same time. It may be advantageous to use an excess greater than 5% of basic equivalents, relative to the cerium equivalents. The pH of the reaction medium should be higher than 6, and must not exceed approximately 10. Advantageously, it ranges from 7 to 9. It may be especially advantageous to control the pH within these limits at a constant value, within ±0.1 of a pH unit.

The solution of at least one acid and/or salt, the anion or anions of which are adapted to form insoluble compounds of the rare earths according to the invention, may in particular be an aqueous solution of any acid and/or salt, the anion of which is selected from among at least one of the following anions: oxalate, fluoride, carbonate, borate, silicate, sulfate, phosphate. The salt or salts are those soluble in water, preferably salts of ammonium, sodium and potassium. This solution is introduced into the reaction medium individually or in admixture with the basic solution. In particular, salts are preferably used, the anion of which is a fluoride, a sulfate, a borate or a phosphate.

The concentration of the acid and/or salt solution is also not critical and may vary over wide limits. However, it is preferably less than 6 moles per liter and more preferably ranges from 2 to 4 moles per liter.

According to the process described in French Pat. No. 2,472,601, it is also possible to continuously add to the reaction medium, either individually or in admixture with the solution of the cerium salt, an aqueous solution of a salt of at least one trivalent rare earth, optionally containing yttrium, and soluble under the conditions of the invention. Exemplary of suitable such salts, the following are especially representative: chlorides and nitrates of lanthanum, praseodymium, neodymium, samarium, europium, gadolinium, terbium, dysprosium, holmium, erbium, thulium, ytterbium, lutecium, yttrium. In particular, a solution containing the cerium salt and salts of the rare earths and originating directly or indirectly in the treatment of rare earth minerals may be used.

The concentration of the salt or salts of a rare earth or earths is not critical and may also vary over wide limits. Preferably however, it ranges from 0.2 to 1 mole per liter.

The different reagents mentioned above are mixed together. It should be noted that the number of anionic equivalents employed is greater than or equal to the number of cationic equivalents used.

The temperature of the reaction medium should preferably range from approximately 20° to 95° C. and more preferably from 50° to 70° C.

The retention time of the mixture in the reaction medium too is not a critical factor and may vary over wide limits. Generally, retention times of from approximately 30 min to 2 hr are utilized.

The reaction mass may be aged for a certain period of time at a temperature of from approximately 20° to 95° C., and preferably from 50° to 80° C., prior to the filtering operation. In this case, the aging time is not a critical factor according to the invention and may also vary over wide limits. A period of time up to 2 hr is nonetheless typically satisfactory.

The second stage of the process for producing the composition as described in French Pat. No. 2,472,601 entails filtering the reaction mass (present in suspension form) upon completion of the reaction.

The filter cake may subsequently be washed with water or with a solution of an ammonium salt.

The material obtained after filtering and optional washing is then dried, optionally continuously. The drying temperature preferably ranges from 100° to 600° C. While the drying time is not critical, it typically varies under these conditions from 30 min to 24 hr.

The dry material is then calcined, optionally in a continuous operation at a temperature of from 600° C. to 1200° C. over a period of time of from approximately 30 min to 2 hr.

The compositions produced according to the procedure described above may be optionally subjected to the operations of grinding and grain size selection utilizing techniques well known to this art.

In a preferred embodiment of the present invention, compositions based on ceric oxide produced by the aforedescribed process are used, preferably using anions such as fluorides, sulfates, borates or phosphates.

Ceric oxide in the form of the compositions described in French Pat. No. 2,549,846 is also suitable. Such compositions comprise a crystallographic phase of the $CeO_2$ type, and a crystallographic phase of a pyrosilicate of rare earths and corresponding to the formula $Ln_{2-x}Ce_xSi_2O_7$ in which Ln represents at least one element selected from among the lanthanides and yttrium, and in which x is greater than or equal to 0 and less than 2.

The compositions described in said French Pat. No. 2,549,846 reflect the following chemical analysis:
(i) 75% to 95% by weight of rare earths, expressed as the oxides thereof, having a ceric oxide percentage, relative to the total weight of the rare earths oxides, ranging from 60% to 85%;
(ii) 5% to 25% by weight of silicon, expressed as $SiO_2$.

Such compositions essentially consist of two crystallographic phases: a $CeO_2$ type having a cubic structure and a phase of rare earth pyrosilicate $Ln_{2-x}Ce_xSi_2O_7$ having an orthorhombic structure; x is greater than or equal to 0 and less than 2, and preferably greater than or equal to 0 and less than or equal to 0.2. They also contain lesser amounts of a rare earth oxide phase, typically a sesquioxide $Ln_2O_3$ of a fluorine type cubic structure and a silicon dioxide $SiO_2$ phase in the vitrous or crystallized form.

The proportions of the different phases vary as a function of the quantity of the raw materials and the conditions of calcination.

Generally, they are as follows:
(i) $CeO_2$: 30% to 80%;
(ii) $Ln_{2-x}Ce_xSi_2O_7$: 12% to 60%;
(iii) $Ln_2O_3$: 0% to 15%;
(iv) $SiO_2$: 1.5% to 8%.

The compositions described in French patent No. 2,549,846 are produced by a process which includes simultaneously mixing together a solution of the cerium salt, a basic solution, an aqueous solution of a salt of at least one trivalent rare earth or yttrium, and a solution of at least one oxygen derivative of silicon capable of forming insoluble rare earth compounds; and then filtering the precipitate obtained, drying it and calcining it at a temperature in excess of 850° C.

In the first stage of the process, the admixture of the various reagents is carried out.

The solution of the cerium salt, the basic solution and the aqueous solution of the salt of the trivalent rare earth were characterized hereinbefore.

The proportion of the basic solution and the cerium salt solution should be such that the number of equivalents of the basic solution introduced is greater than or equal to the number of cerium equivalents introduced at the same time. It may be advantageous to use an excess greater than 5% of basic equivalents relative to the cerium equivalents. The pH of the reaction medium may range from 5 to 10 and advantageously ranges from 7 to 9. It may be particularly advantageous to control the pH within these limits at a constant value within ±0.1 of a pH unit.

The proportion of the solution of a cerirm salt and the aqueous solution of the salt or salts of the trivalent rare earths is such that the ratio of the cerium dioxide and the rare earth oxides ($CeO_2 + Ln_2O_3$) ranges from 60% to 85% by weight.

The solution of the at least one oxygen derivative of silicon may be any aqueous solution of the oxygen derivative of silicon capable of forming insoluble rare earth compounds. The silicon derivative or derivatives must be soluble in water. The following compounds are exemplary: silicon dioxide, silicic acid and alkali metal silicates. Particularly representative are amorphous silica, metasilicic acid, metadisilicic acid, sodium orthosilicate, sodium silicate of the formula $Na_2O.xSiO_2$, wherein x ranges from 3 to 5, sodium metasilicate, sodium metadisilicate, potassium metasilicate, potassium metadisilicate, and potassium tetrasilicate. These salts may be employed in either the anhydrous or hydrated form.

Preferably, sodium silicate, $Na_2O.4SiO_2$, is used.

The concentration of the solution of the oxygen derivative or derivatives of silicon is not a critical factor according to the invention and may vary over wide limits. If expressed in moles/liter of $SiO_2$, it advantageously ranges from 0.1 to 2.0.

The proportion of the solution of the oxygen derivative or derivatives of silicon and the aqueous solution of the salt or salts of the trivalent rare earths is defined in a fashion such that the ratio of silicate equivalents ($SiO_3^=$) to the trivalent rare earth or rare earths equivalents advantageously ranges from 0.1 to 1 and preferably from 0.2 to 0.6.

In the process described in French patent No. 2,549,846, the number of anionic equivalents employed is greater than or equal to the number of cationic equivalents. However, it must not give rise to the formation of adsorption compounds on the composition obtained upon admixture of the reagents.

The mixture of the different solutions of the aforementioned reagents may be carried out according to any one of a number of different techniques. For example, the admixture may be effected under agitation by continuously and separately adding the cerium salt, optionally the solution of the oxidizing agent, the solution of the rare earth salt or salts, the solution of the oxygen derivative or derivatives of silicon and the basic solution. It is also possible to prepare a premixture of the cerium salt solution and the solution of the rare earth salt or salts, which premixture is then added continuously to the reaction medium in parallel with the two other solutions. A premixture of the solution of the oxygen derivative or derivatives of silicon and the basic solution may also be formulated. If an oxidizing agent is used, it is possible to use it in admixture with a solution other than the basic solution, in particular in admixture with the cerium salt solution and/or the solution of the rare earth salt or salts.

The operations of mixing, filtering and drying are carried out under the aforedescribed conditions.

The dried material is then calcined, optionally continuously, at a temperature of at least 850° C., but preferably at a temperature ranging from 850° to 1050° C. The upper limit on the aforenoted temperature range is not critical and may be as high as 1500° C.

The calcined material is then ground such that it will have aggregate dimensions of from 0.2 to 5.0 μm. Typically, the size of the aggregates expressed as the mean diameter ranges from 0.5 to 1.5 μm. The mean diameter is defined as a diameter such that 50% by weight of the aggregates have a diameter larger or smaller than the mean diameter.

The grinding operation may be accompanied by a grain size selection process which may be carried out simultaneously or successively.

The ceric oxide compositions described in French patent No. 2,545,830, which contain ceric oxide combined with at least one colorless oxide of another trivalent rare earth, are also well suited for use according to the present invention.

The following are exemplary of the colorless rare earth oxides: the oxides of lanthanum, samarium, europium, gadolinium, dysprosium, thulium, ytterbium, lutecium and yttrium. These oxides are generally in the sesquioxide form.

It is of course also possible to use a mixture of these oxides.

Lanthanum sesquioxide is preferably used.

The proportions of the ceric oxide and the rare earth oxides in the polishing composition described in French patent No. 2,545,830 may be within the following limits:

(i) 40% to 99.5% by weight of ceric oxide;
(ii) 0.5% to 60% by weight of the rare earth oxides.

Preferably, a composition containing the following is selected:

(i) 85% to 98% by weight of ceric oxide;
(ii) 2% to 15% by weight of the rare earth oxides.

The compositions described in French patent No. 2,545,830 are prepared by simultaneously and continuously mixing together a solution of the cerium salt, a basic solution, and a solution of at least one salt of a trivalent rare earth selected from among the lanthanides and yttrium, the oxide of which is colorless (with the number of basic equivalents being greater than or equal to the number of cerium and rare earth equivalents and the pH of the reaction medium being greater than 6), and then by filtering the resulting precipitate, and drying and calcining same.

In the first stage of such process, the mixing of the different reagents is carried out.

The solution of the cerium salt and the basic solution has been described hereinabove.

According to the process described in French patent No. 2,545,830, either separately or in admixture with the solution of the cerium salt, an aqueous solution of the salt of at least one trivalent rare earth selected from among the lanthanides and yttrium (and adapted to form a colorless oxide) is added to the reaction medium. The salt must be soluble under the conditions of the present invention. Exemplary of such suitable salts, particularly representative are the chlorides or nitrates of lanthanum, samarium, europium, gadolinium, dysprosium, thulium, ytterbium, lutecium and yttrium.

The concentration of the solution of the salt or salts of the rare earth or earths is not critical and may vary over wide limits. Preferably, however, it ranges from 0.2 to 4 moles per liter.

The proportion between the solution of the cerium salt and the solution of the salt or salts of the rare earth or earths is determined by controlling the respective flow rates in a manner such that the desired composition is ultimately produced. The proportion between the basic solution and the solution of the cerium salt and the salt or salts of the rare earth or rare earths must be such that the number of basic equivalents introduced is greater than or equal to the number of cerium and rare earth or earths equivalents introduced simultaneously.

It may be advantageous to use an excess greater than 5% of basic equivalents relative to the cerium and rare earth or earths equivalents. The pH of the reaction medium should then be greater than 6, but must not exceed 10. Advantageously, it ranges from 7 to 9. It may be particularly advantageous to control the pH within these limits at a value within ±0.1 of a pH unit.

It is possible to prepare the mixture of the different solutions of the aforementioned reagents according to any one of a number of different variants. For example, the admixture may be carried out under agitation by continuously and separately adding the solution of the cerium salt, optionally the solution of the oxidizing agents, the solution of the salt or salts of the rare earth or earths and the basic solution. It is also envisaged to effect a premixture of the solution of the cerium salt and the solution of the salt or salts of the rare earth or earths, which is added continuously to the reaction medium in parallel with the basic solution. If an oxidizing agent is employed, it is possible to use it in admixture with the solution of the cerium salt and/or the solution of the salt or salts of the rare earth or earths.

The temperature of the reaction medium is not critical and preferably ranges from 10° to 95° C., more preferably from 20° to 70° C.

The retention time of the mixture in the reaction medium is also not critical and may vary over wide limits. Generally, a retention time of from 30 min to 2 hr is appropriate.

In one embodiment of the process described in French patent No. 2,545,830, the reaction mass may be aged for a certain period of time at a temperature of from 10° to 95° C. and preferably from 20° to 80° C. prior to filtering. In this case, the aging time is not critical and may vary over wide limits. However, a period of time of from 30 min to 2 hr is generally satisfactory. The aging operation is carried out under agitation.

The second stage of the process for producing the composition described in French patent No. 2,545,830 includes filtering the reaction mass (which is in the form of a suspension) upon completion of the reaction.

The filter cake may then be washed with water.

The product obtained after filtration and optional washing is then dried, optionally in a continuous manner. The drying temperature preferably ranges from 100° to 600° C., and the drying time varies under these conditions from 30 min to 2 hr.

The dry product is subsequently calcined, optionally continuously, at a temperature of from 600° to 1200° C., preferably from 950° to 1150° C., for a period of time typically ranging from 30 min to 10 hr.

The calcined product is ground and, optionally, a grain size selection operation is carried out, as in French patent No. 2,549,846.

Another embodiment of the process described in French patent No. 2,545,830 includes preparing the mixture effected in the first stage according to two methods (1) and (2), which are similar in all respects except for the reaction temperature: method (1) results in a precipitate in the hot state, while according to method (2) the precipitate is obtained cold. The mixture of the precipitates obtained by the method (1) and method (2) is carried out either before or after filtering.

The specifics of this embodiment are set forth in said French patent No. 2,545,830.

Consistent herewith, in the subject polishing compositions for the polishing of organic glasses, either ceric oxide alone or in the form of a compound thereof, and a cerous salt, are present.

Respecting the cerous salt, any salt of cerium (III) that is soluble under the conditions of polishing is suitable. This cerium (III) salt must be soluble in water, or water slightly acidified to a pH lower than 7.

Exemplary of the cerous salts suitable for use according to this invention, the inorganic salts, whether in the anhydrous or crystalline state, are representative, such as, for example, the chloride, sulfate, nitrate of cerium (III), or certain organic salts, such as, for example, cerium (III) acetate.

Cerium (III) nitrate is preferably used.

The proportion of the components is such that the weight percentage between the cerous salt expressed as cerium (III), and the ceric oxide, expressed as $CeO_2$, ranges from 0.2% to 5%. The upper limit is not critical, but there is no advantage in using a large amount of the cerous salt. Preferably, the aforesaid percentage ranges from 0.5% to 1.5%.

The polishing compositions according to the invention may be in the form of an aqueous suspension, the concentration in ceric oxide of which may vary over wide limits, for example, from 50 to 600 g/l, but it preferably ranges from 250 to 450 g/l.

The aqueous medium is preferably deionized or distilled water.

The subject compositions may also be in powder form. In this case, the formulation is carried out by admixture of the ceric oxide with the salt of cerium (III) in the solid state. The components may be mixed together in a powder mixer of known type: free fall mixers of the drum type, vertical or horizontal mixers having helical screws, planetary mixers, Lodige type horizontal mixers, and the like.

The duration of the mixing is a function of the apparatus used and should be continued until a homogeneous mixture results.

Another embodiment includes the use of impregnation techniques, by impregnating the ceric oxide with an aqueous solution of the cerium (III) salt.

In a practical manner, such impregnation may be carried out by atomizing the solution of the cerium (III) salt onto the ceric oxide, for example, in a rotary coating machine.

It is also possible to impregnate the ceric oxide by soaking it in the solution of the cerium (III) salt and eliminating the excess solution by dripping and drying, most often at the ambient temperature.

In a preferred embodiment of the invention, the impregnation is carried out "dry", i.e., the total volume of the solution used is approximately equal to the total pore volume of the support. The pore volume is determined by known mercury porosimeter method (ASTM Standard D 4284-83), or else the amount of water absorbed by a sample may be measured.

The compositions of the invention, whether in the form of an aqueous suspension or a powder, are useful for the polishing of all organic glasses.

Thus, they may be used to polish organic glasses produced from thermoplastic polymers, such as cellulose, cellulose diacetate, reinforced aceto-butyrate, polymethylmethacrylate and polystyrene, or monoplastic polymers, such as plasticized urea-formaldehyde, polydiallylphthalate, polydiallylglycol carbonate, etc.

The subject compositions are especially suitable for the polishing of organic glasses of polydiallyldiethylene glycol carbonate.

The field of application of the invention is not limited to the polishing of ophthalmic lenses, and includes the polishing of all organic glasses, regardless of the form in which they exist.

The compositions of the invention are used for the polishing of glass in conventional manner. As they are typically employed in a spray polishing system, they are in suspension in water.

The preparation of the polishing baths is carried out simply by the addition of the composition of the invention, in powder form, to the aqueous medium which is agitated manually or by conventional agitating means (anchor, helical, turbine agitators, or the like) or are used as such if the composition of the invention is in the form of an aqueous suspension.

The amount of composition utilized is such that generally the concentration of the composition, expressed as $CeO_2$, ranges from 50 to 600 g per liter of the bath, preferably approximately 250 to 450 g/liter.

The amount of water used in the preparation of the polishing bath is not critical, but it is preferable, in order to impart good maintenance in suspension of the composition of the invention, to use a soft water, i.e., a water having a hardness of less than 5°.TH.

It may be advantageous to add to the polishing bath an antifoaming agent, such as, for example, a polysiloxane. The amount of such agent may constitute from 0.1 to 10% by weight of the composition of the invention.

The temperature of the bath is selected such that it is less than 30° C. It is advantageous to utilize lower temperatures, ranging from 1° to 10° C., as any increase in temperature decreases polishing efficiency.

The polishing compositions of the invention offer numerous advantages:

(a) they provide good stability of suspension;

(b) they provide an improved performance: very good polishing efficiency, as high as that attained with alumina and, thus, rapid polishing (a time advantage of up to 50% relative to that required using ceric oxide alone), as well as very low rates of rejection of the polished final articles;

(c) they make it possible to impart a very good surface condition: no haze, cracks or streaks;

(d) they have a useful life as long as in the case of the use of alumina, without a reduction in production rates.

In the examples to follow of the compositions of the invention for the polishing of organic glasses, the following polishing test was employed to evaluate their performance:

In the different experiments, polydiallyldiethyleneglycol carbonate organic glasses marketed under the designation CR 39 or ORMA 1000 were used.

These were configured as spherical rollers having a diameter of 70 mm, only the concave face (concavity=−6 diopters) of which was subjected to the polishing operation. The other face surface, which was not polished, was coated with a flat black paint to protect said surface and to facilitate the observation of the resulting polish.

In view of their fragility and sensitivity to scratching, organic glasses require preparation: clear polishing, which consists of preparing the surface of the roller and to provide a reproducible surface in order to subsequently quantify the material removed during the polishing operation.

1. The clear-polishing tests were carried out on a COBURN 603 single spindle machine, the polishing element of which was sprayed uniformly with water.

The operating conditions were as follows:
(i) Polisher velocity: 500 rpm
(ii) Spindle velocity: identical, as the spindle is rotated by the polisher
(iii) Pressure: 40 g cm$^2$
(iv) Water hardness: 28°TH
(v) Temperature: 20° C.
(vi) Polishing agent: abrasive (UNIVERSAL MF 10)
(vii) Glass to be polished: CR 39
(viii) Turbine flow rate: 1.2 to 1.4 /l min
(ix) Test duration: 1 min The abrasive polishing agent was changed after each test.

The glass prepared in this manner was then polished.

2. The polishing efficiency of the compositions of the invention was measured in the following manner:

The polishing tests were carried out on a COBURN 603 machine having a single spindle, the polishing element of which was a flocked velour, and it was sprayed uniformly with the composition to be tested.

The operating conditions were the following:
(i) Polisher velocity: 750 rpm
(ii) Spindle velocity: identical, as the spindle is rotated by the polisher
(iii) Pressure: 300 g/cm$^2$
(iv) Concentration of suspension: 400 g/l
(v) Water hardness: 5°TH
(vi) Temperature: 20° C.
(vii) Polishing element: flocked velour (ALPHA LAP)
(viii) Glass to be polished: CR 39
(ix) Turbine flow rate: 1.2 to 1.4 /l min
(x) Duration of test: 7 min Prior to performing the polishing efficiency measurements, the machine was adjusted using a standard product.

The concave face of two glass rollers was worked for 7 minutes, after which the material removal was determined by weighing.

The average weight removed is relative to:
(a) Unit of weight: mg
(b) Unit of surface: dm$^2$
(c) Unit of time: min The polishing efficiency is expressed as the average of 3 tests.

3. The very nature of the substrate requires that the polishing of organic glasses be discussed in terms of efficiency combined with the quality of the polish.

The condition of the surface was observed immediately following polishing, while avoiding any mechanical pressure on the surface, particularly during the rinsing with deionized water and drying with compressed air.

After drying, the state of the surface was observed in three different and successive manners:
(i) with the naked eye, to determine large cracks;
(ii) with a magnifying glass, to detect finer cracks and grain. These would indicate an insufficient polishing time, as it is due to a clear-polishing residue;
(iii) with a light condenser. The light beam impacts the surface in a glancing manner and makes it possible to observe streaks, and particularly the presence of hazing after polishing.

In order to further illustrate the present invention and the advantages thereof, the following specific examples are given, it being understood that same are intended only as illustrative and in nowise limitative.

Examples 1 to 4 describe the polishing compositions which subsequently were tested for the polishing of organic glass, such as described in Example 5.

Examples 6 to 8 illustrate, relative to the preceding examples, different polishing compositions, using either another source of ceric oxide (Example 6) or a different cerous oxide (Examples 7 and 8) and their use in the polishing of organic glass.

In said examples to follow, all parts and percentages are given by weight.

EXAMPLE 1

A ceric oxide suspension was produced from a ceric oxide composition containing 66% ceric oxide. This composition, prepared according to French patent No. 2,472,601, is commercially available under the trademark Cerox 1600.

In particular, the properties of Cerox 1600 are the following:
I. Chemical composition:
 (i) Rare earth oxides: 94%
 (ii) Ceric oxide: 66%
 (iii) Lanthanum oxide: 19%
 (iv) Neodymium oxide: 9%
 (v) Praseodymium oxide: less than 0.0001%.
 (vi) Fluoride expressed in F$^-$: 4%
 (vii) Phosphate, expressed as $P_2O_5$: 4%
II. Apparent packed density: $d_A = 1.6 \pm 0.2$
III. Specific surface: s.s = $6 \pm 1$ m$^2$/g
IV. Mean particle diameter: $d_{50} = 1.5 \pm 1$ μm
V. Percentage of particles having a diameter larger than 15 μm: 0%

One liter of an aqueous suspension of ceric oxide was prepared, same having the following composition:
(i) 400 g Cerox 1600;
(ii) 12 g cerous nitrate $Ce(NO_3)_3.6H_2O$;
(iii) 940 cm$^3$ deionized water.

EXAMPLE 2

A ceric oxide suspension was produced from a ceric oxide composition containing 92% ceric oxide. This composition, prepared according to French patent No. 2,545,830, is marketed by RHONE-POULENC Co. under the trademark Cerox G.G.

Cerox G.G. has the following properties:
I. Chemical composition
 (i) ceric oxide: 92%
 (ii) lanthanum sesquioxide: 8%
II. Apparent packed density: $d_A = 1.6 \pm 0.2$
III. Specific surface: s.s. = $6 \pm 2$ m$^2$/g
IV. Mean particle diameter: $d_{50} = 1 \pm 0.5$ μm
V. Particles with diameter larger than 15 μm: =0%

One liter of an aqueous suspension of ceric oxide was prepared, having the following composition:
(i) 400 g Cerox G.G.;
(ii) 12 g cerous nitrate $Ce(NO_3)_3.6H_2O$;
(iii) 940 cm$^3$ deionized water.

EXAMPLE 3

In this example, the polishing composition was prepared in the powder form.

In a static mixer, 1000 g Cerox 1600 and 30 g crystalline cerous nitrate $Ce(NO_3)_3.6H_2O$, were mixed together dry. The mixing operation was continued for 2 hr.

The mixture was then directly placed in suspension in deionized water, in the concentration required for polishing, i.e., 400 g/l (expressed as $CeO_2$).

EXAMPLE 4

In the following example, the polishing composition was produced by impregnation.

1000 g Cerox 1600 and 200 cm$^3$ of a cerous nitrate solution containing 150 g/l Ce(NO$_3$)$_3$.6H$_2$O, were mixed together.

The mixing operation was continued for 1 hr.

The mixture was then placed in suspension directly in deionized water, in the concentration required for polishing, i.e., 400 g/l (expressed as CeO$_2$).

EXAMPLE 5

The compositions described in Examples 1 to 4 were used in a polishing test carried out under the aforementioned conditions.

The results are reported in Table I:

TABLE I

|         | Polishing efficiency in mg/dm$^2$/min | Quality of polish |
|---------|---------------------------------------|-------------------|
| Example 1 | 55 ± 5 | no cracks no haze on surface |
| Example 2 | 50 ± 5 | no cracks no haze on surface |
| Example 3 | 55 ± 5 | no cracks no haze on surface |
| Example 4 | 55 ± 5 | no cracks no haze on surface |

As a comparison, in Table II the polishing efficiency of polishing compositions having the compositions of Examples 1 to 4, but with the cerous salt omitted, is reported:

TABLE II

|        | Polishing efficiency in mg/dm$^2$/min | Quality of polish |
|--------|---------------------------------------|-------------------|
| Test A | 25 | fine cracks - surface haze |
| Test B | 20 | fine cracks - surface haze |
| Test C | 25 | fine cracks - surface haze |
| Test D | 25 | fine cracks - surface haze |

EXAMPLE 6

A suspension of ceric oxide was prepared from a ceric oxide composition containing 63% ceric oxide and prepared according to French patent No. 2,549,846, said composition being marketed by RHONE-POULENC Co. under the commercial designation of Cerox S.

Cerox S has the following properties:
I. Chemical composition:
  (i) ceric oxide: 63%
  (ii) lanthanum oxide: 27%
  (iii) rare earth oxide: 90%
  (iv) silica: 10%
II. Apparent packed density: $d_A = 1.6 \pm 0.2$
III. Specific surface: s.s. = 5 ± 3 m$^2$/g
IV. Mean particle diameter: $d_{50} = 2 \pm 1$ μm
V. Percentaoe of particles with diameters larqer than 15 μm = 0%

One liter of an aqueous suspension of ceric oxide having the following composition was prepared:
  (i) 400 g Cerox S;
  (ii) 12 g cerous nitrate Ce(NO$_3$)$_3$.6H$_2$O;
  (iii) 940 cm$^3$ deionized water.

The polishing efficiency which was realized using the foregoing composition was 56 mg/dm$^2$/min.

There were no cracks or surface hazing on the polished organic glass.

EXAMPLE 7

In this example, a solution of cerous chloride having 250 g/l CeCl, prepared by the dissolution of cerous carbonate in an aqueous solution of hydrochloric acid, was used.

One liter of an aqueous suspension of ceric oxide having the following composition was prepared:
  (i) 400 g Cerox 1600;
  (ii) 27.2 cm$^3$ of the aforesaid solution, i.e., 6.8 g CeCl$_3$;
  (iii) 913 cm$^3$ deionized water.

The polishing efficiency which was realized using the aforementioned polishing composition was 48 mg/dm$^2$/min.

No cracks or surface hazing were detected on the polished organic glass.

EXAMPLE 8

In this example, cerous acetate was used as the cerous salt.

One liter of an aqueous suspension of ceric oxide having the following composition was prepared:
  (i) 400 g Cerox 1600;
  (ii) 9.5 g cerous acetate Ce(CH$_3$COO)$_3$. 1.5 H$_2$O;
  (iii) 940 cm$^3$ deionized water.

The polishing efficiency which was realized using this polishing composition was 49 mg/dm$^2$/min.

The organic glass displayed no cracks or surface hazing after polishing.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A cerium-based composition of matter adapted for the polishing of organic glass surfaces, comprising intimate admixture of particulate ceric oxide and at least 0.2% by weight of a water soluble cerous (III) salt based on the weight of ceric oxide.

2. The cerium-based composition as defined by claim 1, comprising at least 30% by weight of ceric oxide.

3. The cerium-based composition a defined by claim 1, said particulate ceric oxide comprising a powder having particle sizes less than about 20 μm.

4. The cerium-based composition as defined by claim 3, said powder having particle sizes ranging from about 0.1 μm to 10 μm.

5. The cerium-based composition as defined by claim 3, said particulate ceric oxide having a specific surface ranging from about 1 to 35 m$^2$/g.

6. The cerium-based composition as defined by claim 5, said particulate ceric oxide having a specific surface ranging from about 3 to 10 m$^2$/g.

7. The cerium-based composition as defined by claim 1, further comprising at least one rare earth oxide other than ceric oxide.

8. The cerium-based composition as defined by claim 1, further comprising a pyrosilicate of the formula Ln$_{2-x}$Ce$_x$Si$_2$O$_7$ in which Ln is a lanthanide or yttrium and x is a number greater than or equal to 0 and less than 2.

9. The cerium-based composition as defined by claim 1, further comprising at least one colorless oxide of a trivalent rare earth other than cerium.

10. The cerium-based composition as defined by claim 9, said other trivalent rare earth comprising lanthanum, sumarium, europium, gadolinium, dysprosium, thulium, ytterbium, lutecium or yttrium.

11. The cerium-based composition as defined by claim 10, comprising lanthanum sesquioxide.

12. The cerium-based composition as defined by claim 1, comprising ceric oxide, lanthanum oxide, at least one other rare earth oxide, and silica.

13. The cerium-based composition as defined by claim 1, comprising an inorganic cerous salt.

14. The cerium-based composition as defined by claim 1, comprising an organic cerous salt.

15. The cerium-based composition as defined by claim 13, comprising cerium (III) chloride, nitrate or sulfate.

16. The cerium-based composition as defined by claim 15, comprising cerium (III) nitrate.

17. The cerium-based composition as defined by claim 1, wherein said cerous salt comprises from 0.2% to 5% by weight of said ceric oxide.

18. The cerium-based composition as defined by claim 17, wherein said cerous salt comprises from 0.5% to 1.5% by weight of said ceric oxide.

19. The cerium-based composition as defined by claim 1, wherein said ceric oxide is impregnated with said cerous salt.

20. The cerium-based composition as defined by claim 1, said ceric oxide comprising those particulates produced by simultaneously and continuously mixing a solution of a cerium salt, a basic solution and a solution of at least one acid and/or salt, the anion or anions of which are adapted to form insoluble rare earth compounds, the number of basic equivalents introduced being equal to or greater than the number of cerium equivalents and the pH of the reaction medium being higher than 6, and then filtering the precipitate which results and drying and calcining such precipitate.

21. The cerium-based composition as defined by claim 20, said reaction medium comprising an aqueous solution of at least one trivalent rare earth.

22. The cerium-based composition as defined by claim 20, said anion or anions comprising a fluoride, a sulfate, a borate or a phosphate.

23. The cerium-based composition as defined by claim 1, said ceric oxide comprising those particulates produced by simultaneously mixing a solution of a cerium salt, a basic solution, an aqueous solution of the salt of at least one trivalent rare earth or yttrium and a solution of at least one oxygenated silicon compound adapted to form insoluble rare earth compounds, and then filtering the precipitate which results and drying and calcining such precipitate at a temperature greater than 850° C.

24. The cerium-based composition as defined by claim 1, said ceric oxide comprising those particulates produced by simultaneously and continuously mixing a solution of a ceric salt, a basic solution and a solution of at least one salt of a trivalent lanthanide or yttrium, the oxide of which is colorless, and wherein the number of basic equivalents introduced is greater than or equal to the number of cerium and rare earth equivalents and the pH of the reaction medium is higher than 6, and then filtering the precipitate which results and drying and calcining such precipitate.

25. A suspension, in water, of the cerium-based composition as defined by claim 1.

26. The aqueous suspension as defined by claim 25, having a concentration ranging from 50 to 600 g/l.

27. The aqueous suspension as defined by claim 26, having a concentration ranging from 250 to 450 g/l.

28. In a method for the polishing of an organic glass surface utilizing an abrasive polishing agent, the improvement which comprises, as the polishing agent therefor, the cerium-based composition as defined by claim 1.

29. In a method for the polishing of an organic glass surface utilizing an abrasive polishing agent, the improvement which comprises, as the polishing agent therefor, the aqueous suspension as defined by claim 25.

30. The polishing method as defined by claim 29, said organic glass surface comprising a plastic ophthalmic lens.

31. The polishing method as defined by claim 29, said organic glass surface comprising a plastic sheet material.

* * * * *